Jan. 26, 1965   F. D. ROBERGE   3,167,278
ORDNANCE AERIAL TRANSFER SYSTEM
Filed Oct. 4, 1962   2 Sheets-Sheet 1
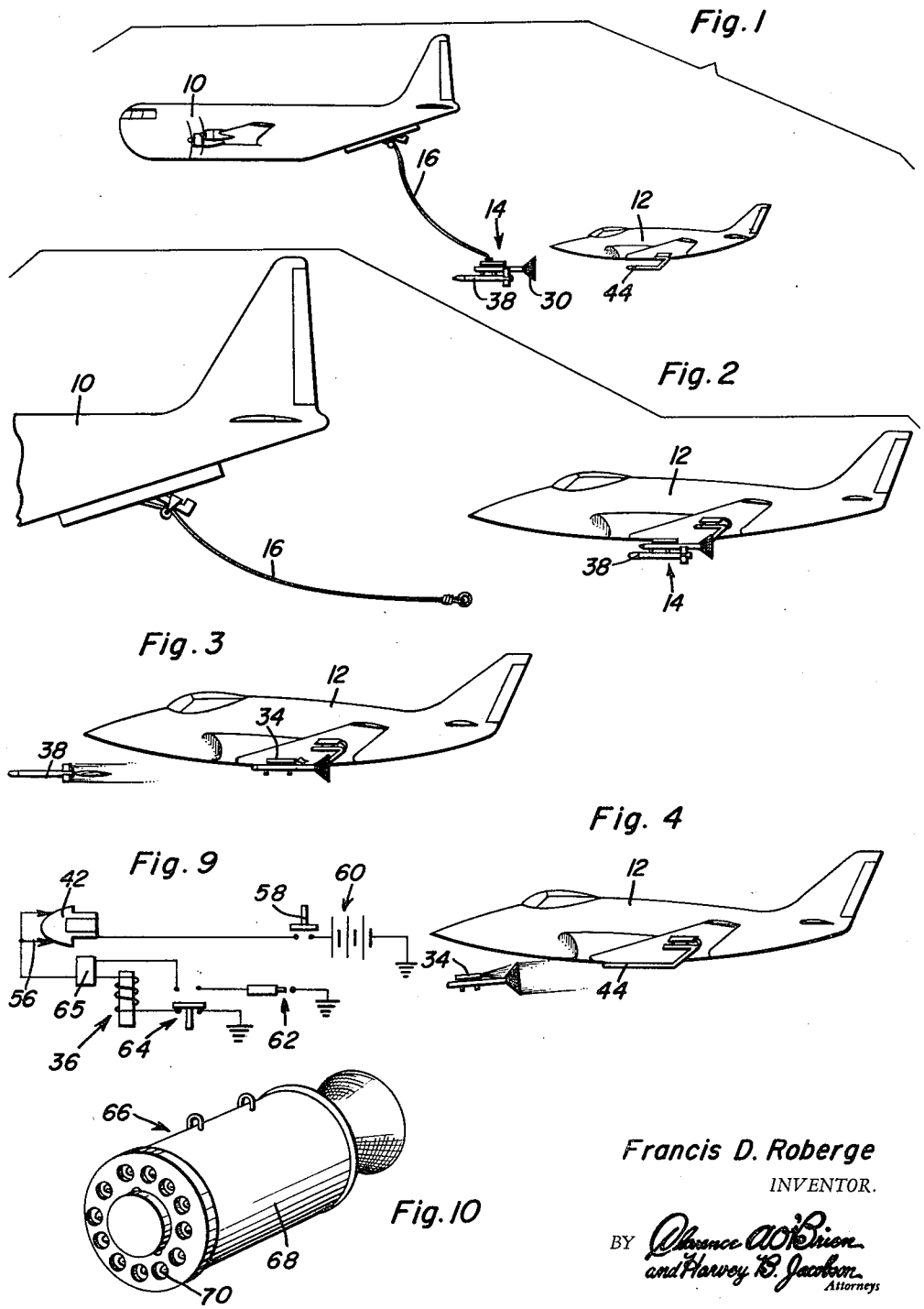
Francis D. Roberge
INVENTOR.

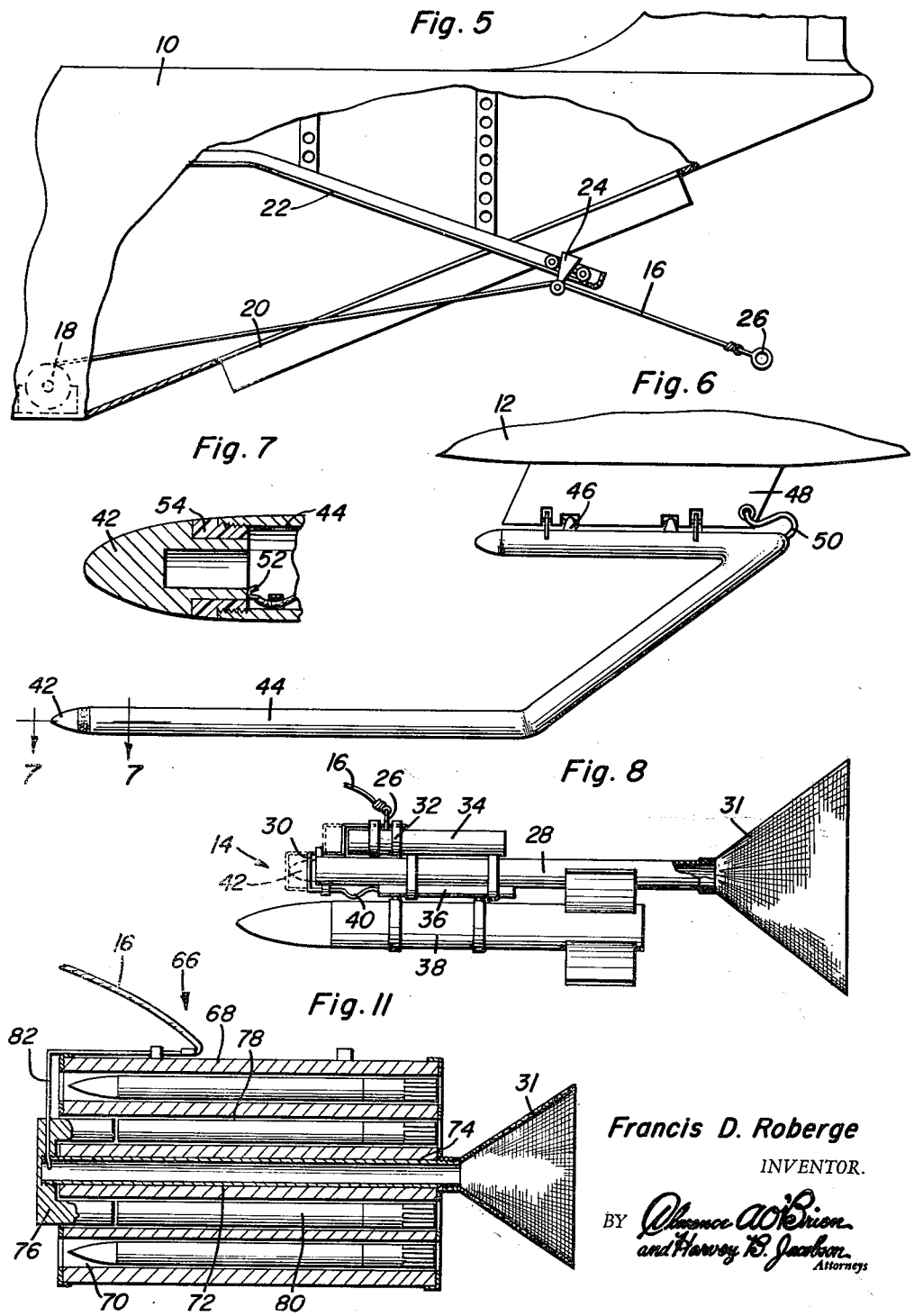

United States Patent Office 3,167,278
Patented Jan. 26, 1965

3,167,278
ORDNANCE AERIAL TRANSFER SYSTEM
Francis D. Roberge, London Bridge, Va.
(14045 Vista Drive, P.O. Box 332, Armona, Calif.)
Filed Oct. 4, 1962, Ser. No. 228,427
10 Claims. (Cl. 244—137)

This invention relates to a new and useful system for transferring ordnance from supply aircraft to ordnance firing receiving aircraft in order to significantly prolong the effective attack period of such receiving aircraft.

The present invention is concerned with the loading of ordnance on military type aircraft during flight. It will be appreciated, that the effective attack period of military aircraft is now governed by several factors including fuel supply, pilot fatigue and supply of ordnance to be delivered onto the target. The fuel supply factor has been alleviated heretofore by in-flight refueling systems involving what is referred to as a probe and drogue procedure. The system of the present invention therefore deals with the ordnance supply factor by providing in-flight reloading of ordnance for the aircraft. Accordingly, the attack duration of aircraft remains limited only by the fatigue of the pilot.

In accordance with the foregoing objectives, the present invention achieves the reloading of ordnance by use of equipment that is relatively simple and inexpensive and involves a procedure for which attack pilots are already trained in connection with in-flight refueling.

A further object of this invention is to provide apparatus which is relatively inexpensive and expendable for mounting of ordnance and facilitating its transfer from the supply aircraft to the receiving aircraft in accordance with the system of the present invention.

The ordnance reloading system of the present invention therefore involves the towing by a cable of an ordnance burdened carrier in the trailing air stream of a supply aircraft so that the carrier may be received on a probe element mounted below ordnance carrying stations on the receiving aircraft as the receiving aircraft approaches the towed carrier. After contact is made between the receiving aircraft probe and the ordnance carrier, the towing cable from the supply aircraft is released from the carrier. At the same time, the ordnance firing or release mechanism is operatively conditioned for selective control by the pilot. When all of the ordnance receiving stations on the receiving aircraft are so loaded, or reloaded, selective release or firing of ordnance from the aircraft may be effected. When the carrier is fully unloaded it is automatically separated from the probe so that the probe may be in condition for reloading.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic view of one stage of the ordnance transfer method wherein the receiving aircraft approaches an ordnance assembly being towed behind a supply aircraft.

FIGURE 2 diagrammatically illustrates a following stage of the transfer method wherein the towing cable is released from the ordnance assembly.

FIGURE 3 illustrates that stage of the system immediately following the firing of the ordnance.

FIGURE 4 illustrates the final stage of the method wherein the receiving aircraft probe is in condition for reloading.

FIGURE 5 is a partial enlarged view of the supply aircraft with parts broken away.

FIGURE 6 is an enlarged partial view of the receiving aircraft illustrating the probe elements.

FIGURE 7 is a partial sectional view taken substantially through a plane indicated by section line 7—7 in FIGURE 6.

FIGURE 8 is a side elevational view of one form of ordnance assembly.

FIGURE 9 is a simplified circuit arrangement for control of the ordance assembly through the probe element.

FIGURE 10 is a perspective view of another form of ordnance assembly.

FIGURE 11 is a longitudinal sectional view of the ordnance assembly illustrated in FIGURE 10.

Referring now to the drawings in detail, it will be observed from FIGURES 1 through 4, that the ordnance transfer system of the present invention involves the transfer of ordnance from a supply aircraft 10 of the cargo type to a receiving aircraft 12 of the attack or intercepter type. An ordnance assembly generally referred to by reference numeral 14 is therefore prepared within the supply aircraft 10 and controllably released into the trailing air stream by means of a tow cable 16 as more clearly seen in FIGURE 1. With reference to FIGURE 5, however, it will be observed that the tow cable 16 is wound upon a winch assembly 18 from which it extends rearwardly through the rear cargo loading opening 20 of the supply aircraft 10. Also projecting through the opening 20, is an overhead boom 22 on which a guiding pulley assembly 24 is slidably mounted for controlling the cable 16. The remote end of the cable 16 is therefore provided with an attaching eye 26 of any suitable type for connection to the ordnance assembly 14.

Referring now to FIGURE 8 in particular, it will be observed that the ordnance assembly 14 includes a carrier tube 28 mounting at one end thereof, a drogue cone 31 made of wire mesh material. Slidably mounted at the forward end of the carrier tube 28, is a cable release mechanism 30 which is displaceable from the position illustrated by solid lines to the position illustrated by dotted lines in order to release the attaching eye 26 of cable 16. The mechanism 30 therefore connects the cable 16 to the assembly 14 between the mounting elements 32 that slidably receive the cable release mechanism 30 on one side of a probe separating rocket device 34 permanently mounted on the carrier tube 28. Also mounted below the carrier tube 28 is a release mechanism 36 by means of which any suitable ordnance 38 is mounted in suspended relation below the carrier tube 28. The release mechanism may therefore be the standard type of wing rack ordnance release mechanism generally associated with the mounting of ordnance directly below the wing of an aircraft. Accordingly, a flexible electrical conductor 40 operatively interconnects the ordnance release mechanism 36 with the cable release mechanism 30.

It will be observed from FIGURE 8, that the cable release mechanism 30 is adapted to be displaced toward its dotted line position when engaged with the probe contact end 42 of a probe element adapted to be received within the tubular carrier member 28. Referring therefore to FIGURES 6 and 7 in particular, it will be observed that the probe element 44 is made of a rigid tubular material and mounted by means of suspension lugs 46 below the wings of the receiving aircraft 12 at each ordnance carrying station thereof. Each ordnance carrying station is therefore provided with the standard wing rack 48 to which the probe element 44 is connected. An electrical cable 50 therefore extends from the pilot control stick in the aircraft 12 through the probe element 44. A connecting lead 52 from the cable 50 is therefore in contact with the conductive probe tip 42 which is mounted on the probe element but insulated therefrom by the insulator 54. It will therefore be appreciated, that the probe tip 42 in addition to displacing the cable release mechanism 30 for release of the cable from the assembly 14, also establishes a conductive path in order to provide selective control over the release mechanism 36 by the pilot.

Referring therefore to FIGURE 9, it will be observed that when the probe 42 engages the release mechanism 30 for displacement thereof, a pair of contact pins 56 will be engaged so as to establish a conductive path from the pilot release control switch 58 to the ordnance release mechanism 36 for energization thereof from the aircraft source of power 60 when switch 58 is closed. It will also be observed that the contact 42 establishes a parallel conductive path to any suitable rocket igniting device 62 disposed in a circuit maintained open by the switch 64 in the position illustrated in FIGURE 9 prior to discharge of the ordnance 38. Switch 64 as shown in FIGURE 9 is a two position switch held in one position when the ordnance is on the carrier and moved to the other position upon unloading of the ordnance in any suitable manner. Many switch actuators suitable for this purpose such as that shown in Patent No. 2,802,074, are available. Accordingly, upon firing of the ordnance 38 by closing of switch 58, the switch 64 will be displaced to its other position opening the energizing circuit for the release mechanism 36 and establish potential across the rocket igniting device 62 for the carrier separating rocket 34 so that the unloaded ordnance carrier 14 may be propelled and thereby separated from the probe element 44. A stepping relay component 65 is also provided for sequentially igniting other ordnance rockets as hereafter explained.

FIGURES 10 and 11 illustrate another form of ordnance assembly generally referred to by reference numeral 66. The ordnance assembly 66 is basically composed of a multi-rocket pod 68 which includes a plurality of rocket carrying tubes 70. The rocket pod is of the type that when fired, each rocket is fired in sequence. The multi-tube rocket pod 68 is, however, modified in that the central tube 72 thereof instead of carrying a rocket, mounts the carrier tube 74 similar to the carrier tube 28 as described with respect to FIGURE 8. The carrier tube 74 therefore also has connected to one end thereof, a wire mesh type of drag cone 31. The forward end of the carrier tube 72, however, mounts a plug assembly 76 which fits within the forward portion of rocket carrying tubes 78 occupying the space ordinarily occupied by the warhead portion of the ordnance missile carried within each of the tubes of the pod 68. Accordingly, the tubes 78 which receive the plug assembly 76, contain rockets 80 without any warhead, said rockets 80 constituting part of the probe separating facilities serving the same function as described in connection with the rocket separating device 34 of the ordnance assembly 14. It is for this reason, that the tubes 78 selected are those to be last fired in the firing sequence associated with the multi-rocket pod. The plug assembly 76 therefore blocks the forward ends of the tubes 78 so that the propelling power of the rockets 80 may be applied to the entire assembly 66 for separation thereof from the probe element. The plug assembly 76 therefore also mounts a cable release mechanism 82 of the type which establishes electrical contact between the contact tip 42 of the probe element in order to release the cable 16 from the assembly 66 in any suitable manner. Ignition of each rocket is then effected sequentially through a rocket firing system of which relay 65 is part. Systems of this type are well known as referred to in Patent No. 2,870,680, and likewise the present invention is not primarily concerned with the details thereof.

From the foregoing description of the equipment and apparatus related to the system of the present invention, utility of the system will be apparent. The ordnance carrier 14 or 66 may therefore be assembled within the the supply aircraft and lowered into the trailing air stream by the tow cable 16 as shown in FIGURE 1. The receiving aircraft 12 may therefore approach the ordnance assembly guiding the probe element 44 into the tubular carrier 28 through the drag cone 31. When the contact tip 42 of the probe element has reached the forward end of the carrier tube 28, the cable release mechanisms 30 will be displaced so that the cable 16 from the supply aircraft 10 will be completely free of the ordnance assembly 14 now mounted at an ordnance carrying station below the wing of the receiving aircraft 12 as seen in FIGURE 2. For reasons hereinbefore indicated, a control circuit will also be rendered operative whereby the pilot may control the release of the ordnance 38 by depression of the control switch 58. Firing of the ordnance 38 as shown in FIGURE 3 will, therefore ignite the probe separating rocket 34 whereupon the unloaded carrier assembly 14 will be propelled and separated from the probe element 44 as shown in FIGURE 4. The probe element 44 will then be conditioned for receiving another ordnance assembly.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An ordnance carrier assembly for aerial transfer to a receiving aircraft comprising, tubular carrier means, cable connecting means mounted on the tubular means for actuation means, ordnance mounting means releasably securing said ordnance means on the tubular means, control means conditioned in response to said actuation of the cable connecting means for discharge of the ordnance means from the tubular means, and separating means rendered operative in response to said discharge of the ordnance means for propelling said tubular means away from the receiving aircraft.

2. In combination with the carrier assembly defined in claim 1, a probe element receivable within the tubular means, suspension means for mounting the probe element on said receiving aircraft, contact means on the probe element engageable with said cable connecting means for said actuation thereof, and operative to establish a conductive path for said conditioning of the control means.

3. The combination of claim 2, wherein said separating means comprises rocket means mounted on said tubular carrier means for propulsion thereof away from the receiving aircraft.

4. The combination of claim 1, wherein said ordnance means comprises a multi-rocket pod assembly having a plurality of rocket-carrying tubes, one of said tubes mounting the tubular carrier means.

5. The combination of claim 4, wherein said separating means comprises warhead replacing plug means mounted on the carrier means for closing at least one of said rocket-carrying tubes containing a propelling rocket without a warhead.

6. The combination of claim 1, wherein said separating means comprises rocket means mounted on said tubular carrier means for propulsion thereof away from the receiving aircraft.

7. A method for in-flight transfer of ordnance from a supply aircraft to a receiving aircraft comprising the steps of: mounting ordnance on a carrier; towing said ordnance loaded carrier in a trailing air stream from the supply aircraft; receiving the towed carrier on a probe by approach of the receiving aircraft to the carrier; releasing the carrier from the supply aircraft after reception by the probe of the receiving aircraft; and separating the carrier from the probe in response to unloading of the ordnance therefrom to condition the probe for reception of another ordnance loaded carrier.

8. A method for in-flight loading of ordnance on aircraft comprising; establishing contact between a supply and receiving aircraft by a probe and drogue procedure to transfer an ordnance carrier; severing contact between supply aircraft and carrier after transfer thereof; and discharging the carrier from the receiving aircraft after release of ordnance therefrom.

9. The method of transferring burdens from an airborne supply craft to an airborne receiving craft including the steps of: releasably mounting each burden on a carrier coupled to a cable attached to the supply craft; establishing burden transferring contact between the carrier and the receiving craft; selectively unloading each burden from the carrier after transfer thereof to the receiving craft; and ejecting the carrier from the receiving craft when unloaded.

10. In combination with a supply craft to which a cable is attached, and a receiving craft having a probe mounted thereon, a carrier having a drogue receiving said probe, a cable connector mounted on the carrier for connection thereof to the cable including means for releasing said connection in response to receipt of the probe in the carrier, load means releasably mounted on the carrier, release means rendered operative to unload the load means from the carrier, contact means mounted on the probe for establishing a control circuit between the receiving craft and the release means in response to said reception of the probe in the carrier, means mounted on the carrier for ejection thereof from the receiving craft, and means responsive to unloading of the load means by the release means for igniting the ejection means.

References Cited by the Examiner
UNITED STATES PATENTS 2,692,121 10/54 Brown _____ 244—137 X
3,008,674 11/61 Abraham _____ 244—135

FERGUS S. MIDDLETON, *Primary Examiner.*

SAMUEL FEINBERG, *Examiner.*